May 6, 1958 F. C. REGGIO 2,833,259
POWERPLANT TEMPERATURE REGULATING DEVICE
Original Filed Dec. 15, 1941 2 Sheets-Sheet 1
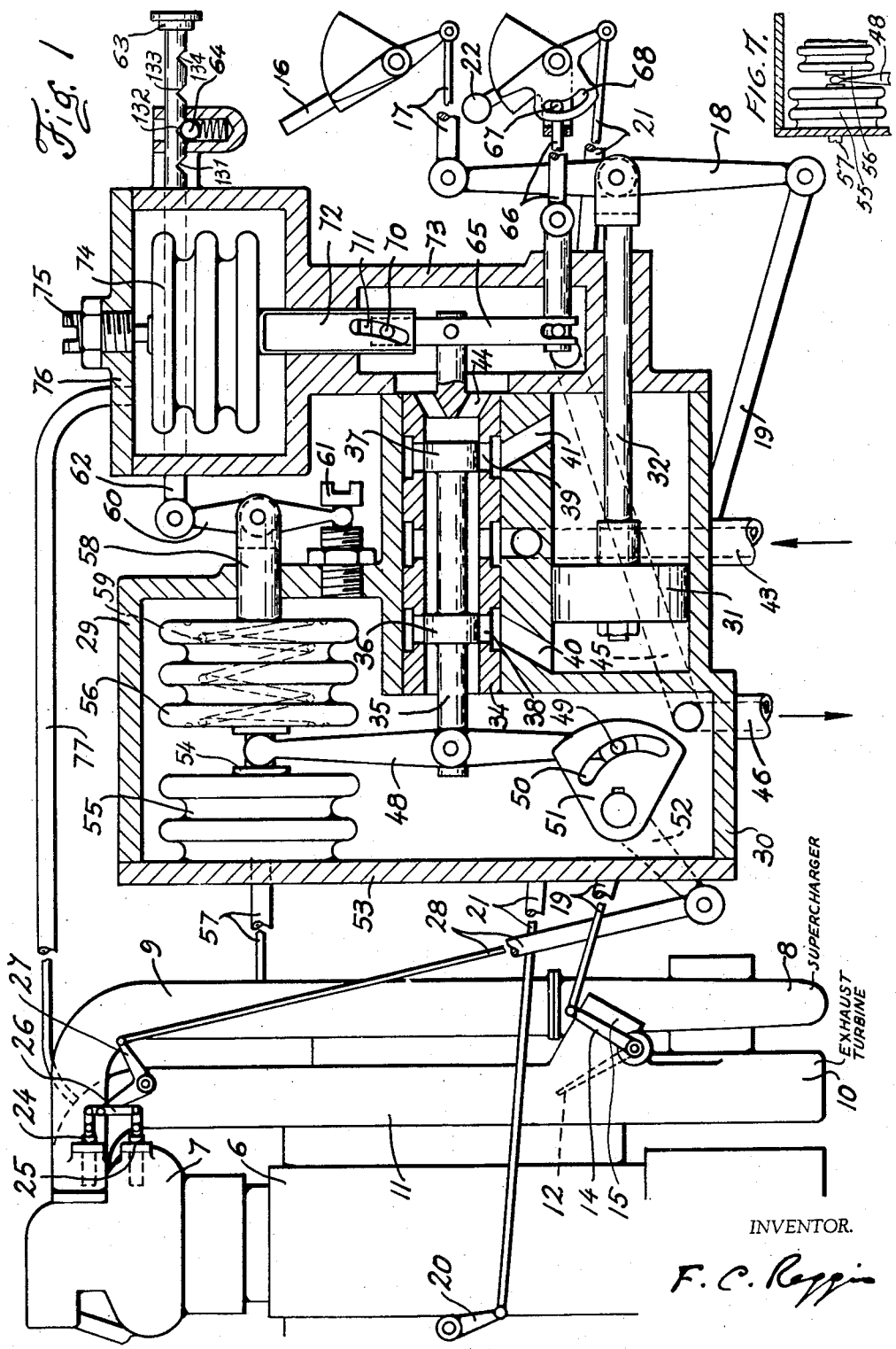
INVENTOR.
F. C. Reggio May 6, 1958  F. C. REGGIO  2,833,259
POWERPLANT TEMPERATURE REGULATING DEVICE
Original Filed Dec. 15, 1941  2 Sheets-Sheet 2
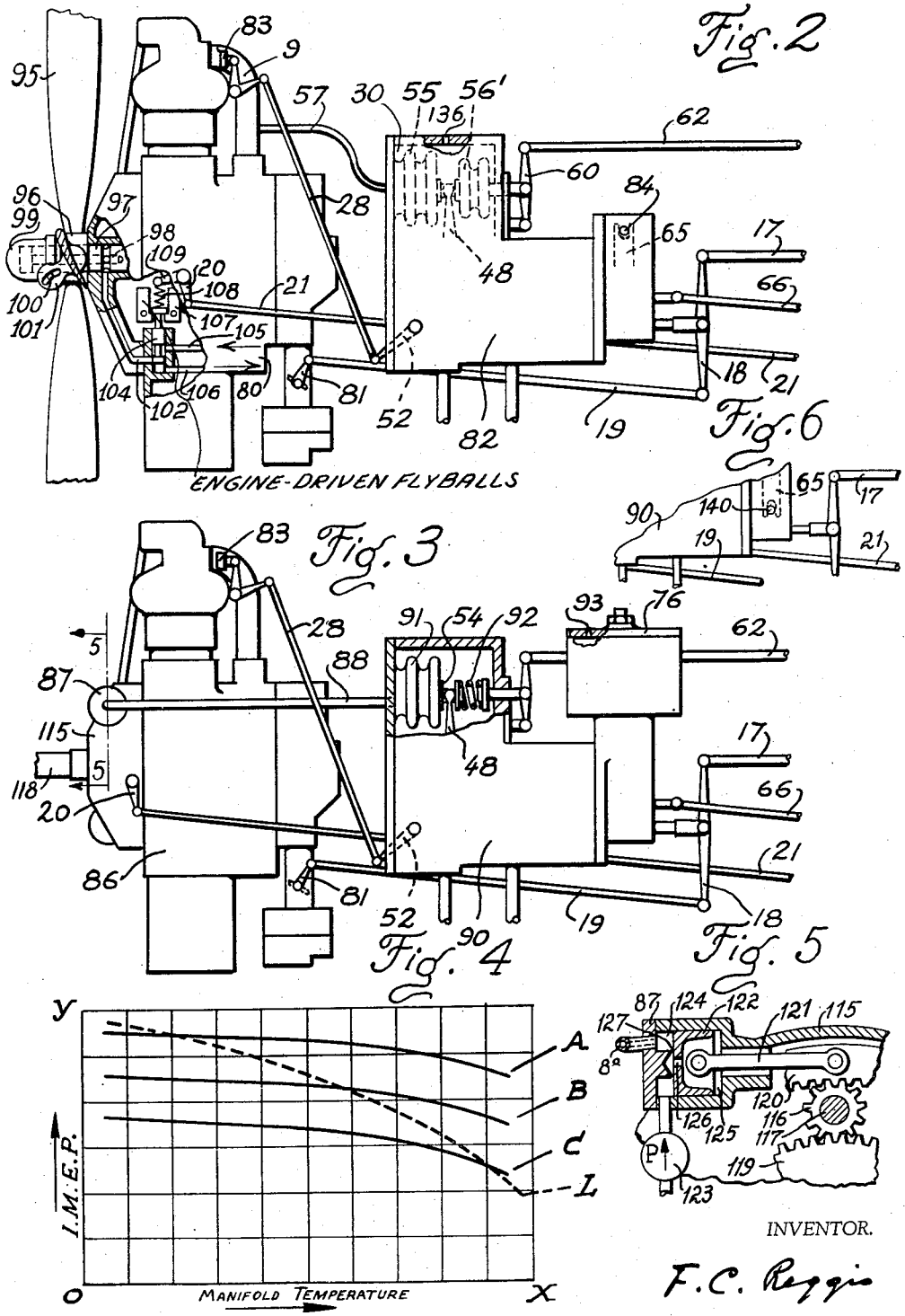
INVENTOR.
F. C. Reggio

United States Patent Office 2,833,259
Patented May 6, 1958

2,833,259

POWERPLANT TEMPERATURE REGULATING DEVICE

Ferdinando Carlo Reggio, Norwalk, Conn.

Continuation of application Serial No. 423,001, December 15, 1941. This application January 10, 1956, Serial No. 558,257

24 Claims. (Cl. 123—103)

This invention relates to improvements in engine regulating devices and has particular reference to an improved regulating device for an automotive engine such as an aircraft engine. This application is a continuation of my copending application Serial No. 423,001, filed December 15, 1941, now abandoned.

An object of the invention resides in the provision of a regulating device for automatically varying the engine power output substantially as a preselected function of one or more engine operative conditions or other conditions affecting the engine operation.

Another object is to provide a regulating device for automatically limiting the maximum engine output to a value depending on at least one variable condition affecting the engine operation such as an engine operative temperature.

A further object is to provide a device for regulating the engine power output by automatically varying the engine induction or manifold pressure in dependence on preselected engine operative conditions and the adjustment of a manual control member.

An additional object is to provide an improved device for regulating the engine either directly from a manually adjustable control member or automatically in dependence on preselected variables.

Other objects and advantages will be more particularly pointed out hereinafter or will become apparent as the description proceeds.

The drawings, in which there are diagrammatically illustrated suitable constructional arrangements for the purpose of disclosing the invention, are for purpose of illustration only and are not to be taken as limiting or restricting the scope of the invention.

In the drawings:

Fig. 1 is a sectional view of the engine regulator and includes in reduced scale a diagrammatic illustration of an aircraft engine and control instrumentalities therefor.

Figs. 2 and 3 are diagrammatic illustrations of partially modified constructions and arrangements of the engine regulator.

Fig. 4 is an example of engine calibration curve.

Figure 5 is a fragmentary section along the line 5—5 of Fig. 3.

Fig. 6 is a fragmentary modification of Fig. 3.

The characteristic power calibration curves of an aircraft engine, represented in Fig. 4, are referred to the axes of abscissae OX and ordinates OY representing the engine manifold temperature and the indicated mean effective pressure respectively. The values of said temperature and pressure increase in the directions indicated by the arrows.

The four curves of Fig. 4 represent the result of actual engine tests conducted with a specified fuel, at a given value of engine speed and exhaust pressure. The curve A represents the engine indicated mean effective pressure developed under a constant value of manifold pressure for different values of manifold temperature. The slope of this curve shows a reduction of indicated M. E. P. with increase in manifold temperature, which is due mainly to the corresponding reduction of density in the induction manifold. Curves B and C similarly indicate the indicated M. E. P. developed for two different lower constant values of manifold pressure. The dotted line L represents the upper limit for continuous operation, from which it is apparent that the maximum admissible value of the manifold pressure, and in turn of the indicated M. E. P., diminishes with an increase of manifold temperature.

In highly supercharged aircraft engines in which said temperature may vary within wide limits, engine regulators for limiting the maximum engine torque or manifold pressure at a constant value have the disadvantage that they either limit the engine output at an unnecessarily low value at low manifold temperature, or overload the engine at elevated temperature, or both. Accordingly, one of the objects of the present invention is to provide a device for limiting the maximum engine output, or torque, or manifold pressure, to a value varying substantially as a preselected function of the manifold temperature.

Furthermore, the upper limit for continuous operation varies upon changes of fuel characteristics and other engine operative conditions such as exhaust pressure, cylinder temperature, engine speed, surrounding atmospheric conditions. Thus a further object of the invention is to provide a regulator for varying the engine output, or the manifold pressure, or the engine torque, upon variation of one or more preselected variables such as the above.

While the curve L represents the upper limit for continuous operation, other similar curves may be determined corresponding to a maximum safe temporary engine overload, such as the upper limit for take-off power, which is also generally found to be dependent upon engine operative conditions such as manifold temperature, exhaust pressure, etc. Accordingly still another object is to provide a regulating device as outlined above, including a control member for selectively limiting the maximum engine output either at a safe value for continuous operation, or at a higher temporary value also variable upon changes of preselected variables. Furthermore the regulating device may be employed for automatically adjusting the engine torque, or output, or the manifold pressure, at values lower than those corresponding to the upper limit for continuous operation, as it will be apparent from the following description.

On form of the invention is illustrated in Fig. 1 in combination with an engine such as an aircraft radial spark ignition engine, although the invention is in no way limited in its application to any particular form or type of engine. Such engine 6 has cylinders 7 receiving air or combustible mixture from a blower or supercharger 8 by way of pipes or manifold 9 forming part of the engine induction system. Liquid fuel may be delivered to the engine by means of a carburetor or injection system, neither of which is shown in Fig. 1. The supercharger 8 is driven at variable speed by an exhaust turbine 10 connected by exhaust pipe 11 to the cylinder exhaust ports. The flow of exhaust gases to the turbine nozzles is regulated by a valve or blast gate 12. When the latter is rotated clockwise by means of an actuating lever 14 all exhaust gases from the engine will be delivered to the turbine, while when valve 12 is rotated anticlockwise the exhaust gases discharge through duct 15 and the turbine becomes inoperative. At intermediate positions of valve 12 more or less exhaust gases will be supplied to the turbine. A control member 16 is connected with lever 14 by way of rod 17, lever 18 and rod 19 and may be employed to directly control the adjustment of valve 12 and in turn the speed of supercharger 8 and the pressure of the air or combustible mixture delivered to the engine cylinders by way of pipe or manifold 9, hereinafter referred to as manifold pressure or supercharged fluid pressure.

Engine 6 may drive a variable pitch propeller 95, provided with a servo-motor such as a hydraulic or electric motor controlled by an engine-driven speed governor 107 adjustable by means of lever 20, rod 21 and control member 22, for controlling said pitch thereof to automatically keep the engine speed constant at a value determined by the adjustment of member 22. Such constant-speed propeller mechanism, which is per se no part of the present invention, is more fully described in said application Serial No. 423,001.

The temperature responsive elements 24 and 25, the former connected to the manifold 9 and responsive to the temperature of the air or combustible mixture therein, hereinafter referred to as manifold temperature, or supercharged fluid temperature, and the latter responsive to the temperature of the engine cylinder, or suitable part associated therewith, or to the coolant temperature in a liquid cooled engine, are connected by way of rods to the ends of lever 26 rotatably carried at an intermediate point thereof by a bell-crank lever 27 for actuating a link or rod 28. An increase of temperature of either element rotates lever 27 clockwise.

The engine regulating device, generally indicated at 29, may conveniently comprise a casing 30 having two parallel cylindrical cavities therein. Within one of said cavities there is disposed a reciprocable piston 31 attached to rod 32 rotatably connected with lever 18 at an intermediate point thereof. In the other cavity there are mounted valve elements such as reciprocable sleeve 34 provided with an axial cylindrical bore in which there is slidably disposed a plunger valve 55 having two spaced cylindrical discs 36 and 37 for controlling ports 38 and 39 which are formed in sleeve 34 and so arranged as to be in permanent flow communication by way of annular grooves formed in sleeve 34 and ducts 40 and 41, respectively, with the cylinder cavity at either side of piston 31.

The annular chamber between discs 36 and 37 is connected by way of suitable ports and line 43 with a source of pressure fluid, usually oil from the engine pressure lubricating system, while the two portions of the sleeve bore external to discs 36 and 37 are intercommunicating by way of conduits 44 and 45, and are maintained at relatively low pressure through return line 46 leading oil back to a reservoir or engine sump. The above outlined hydraulic servo-motor is a known device, and it will be readily understood that with the valve elements in relative neutral adjustment, with ports 38 and 39 closed, as shown in Fig. 1, the piston 31 is maintained stationary. Either a displacement toward the right of plunger valve 35 or a movement to the left of sleeve 34 causes the cylinder chamber to the left of piston 31 to be connected with the oil return line 46, while oil under pressure is admitted to the other side of the piston, thus displacing the latter to the left and determining clockwise rotation of lever 18 about its upper connection and anticlockwise rotation of valve 12. Opposite rotation of the latter is obviously determined by displacement of plunger valve 35 toward the left or movement of sleeve 34 to the right.

The left end of plunger valve 35 is connected with a lever 48 at an intermediate point thereof, while the lower end of said lever is provided with a pin 49 cooperating with a slot 50 formed in disc 51 keyed on a shaft carrying lever 52, which is connected with the rod 28 actuated by bell crank lever 27. Thus the adjustment of the lower end of lever 48 varies as a function of the temperatures of elements 24 and 25, said function depending upon the configuration of slot 50. The upper end of lever 48 is actuated by a member 54 secured to the movable walls of two diaphragm chambers or bellows 55 and 56. The former bellows is secured to the cover 53 of housing 30, and the pressure in said bellows is kept by way of pipe 57 at the same value as in the engine manifold 9, while bellows 56, provided with a calibrated spring 59 tending to expand it, is positioned by a member 58 slidably mounted in the wall of housing 30. A lever 60, rotatably carried at an intermediate point thereof by member 58, is connected at its lower and upper ends with an adjusting member 61 and, by means of rod 62, with a manually adjustable member 63, respectively.

The adjustment of the upper end of lever 48 is thus dependent on the adjustment of member 63, and the engine manifold pressure. If the areas of bellows 55 and 56 are equal, changes of pressure within housing 30 do not affect the adjustment of lever 48, the latter being thus responsive to the absolute manifold pressure. If one of said bellows has larger area than the other, then an increase of pressure within housing 30 will tend to contract said larger bellows, thus displacing lever 48. Furthermore if bellows 56 is not highly evacuated, but contains a substantial mass of expansible fluid, the adjustment of lever 48 will also be affected by changes of temperature within housing 30. The control member 63 may be provided with notches cooperating with a resiliently loaded detent 64. Four notches, 131 to 134, are indicated in Fig. 1.

Sleeve 34 is actuated by lever 65, which is connected at one end thereof with a rod 66 terminating in pin 67 cooperating with a slot 68 formed in speed control member 22, whereby the adjustment of sleeve 34 is dependent on the engine speed. The other end of the same lever carries a pin 70 cooperating with slot 71 formed in rod 72 slidably mounted in a bore of housing 73 and connected with evacuated, resiliently loaded bellows 74 supported by adjustable member 75 carried by the housing cover 76 which closes the bellows chamber. The latter is maintained at exhaust pressure by means of pipe 77 connected with the engine exhaust pipe 11. Thus a change of exhaust pressure determines a corresponding displacement of sleeve 34 dependent on the form of slot 71.

The operation of the regulating device may be substantially as follows: Assuming the control member 63 to be set at maximum power for continuous operation with detent 64 engaging notch 132, control lever 16 in full open adjustment, and lever 22 set for the desired values of engine speed, the valve 12, as shown in Fig. 1, is controlled by the hydraulic servo motor to maintain the engine manifold pressure at a certain value depending on engine operative conditions as will presently be pointed out. A variation of manifold pressure, for example a drop thereof, determines contraction of bellows 55 and displacement of plunger valve 35 to the left, thus setting piston 31 in action to rotate valve 12 clockwise and increase the speed of blower 8 and the manifold pressure until the initial value thereof is restored, whereupon bellows 55 resumes its initial position and returns plunger valve 35 to neutral adjustment relative to sleeve 34. If now the manifold temperature, or the cylinder temperature, or both vary, for instance increase, determining anticlockwise rotation of disc 51, the lower end of lever 48 and plunger valve 35 will be displaced to the right, causing anticlockwise rotation of valve 12 to reduce the supercharger speed and the manifold pressure until bellows 55 has collapsed the necessary amount to bring plunger valve 35 back to neutral position. A lower manifold pressure is thus obtained corresponding to the higher manifold and cylinder temperature; and the form of slot 51 may be so determined that the manifold pressure varies with the manifold temperature substantially as indicated by curve L of Fig. 4. Similarly, either a variation of exhaust pressure causing expansion or contraction of bellows 74, axial displacement of rod 72 and corresponding displacement of upper end of lever 65, or a change in the adjustment of speed control lever 22 causing a corresponding displacement of the lower end of same lever, produce an axial displacement of sleeve 34 which sets piston 31 in motion to vary the manifold pressure until bellows 55 has expanded or contracted to the extent of bringing plunger 35 again to neutral adjustment relative to sleeve 34 in the new position of the latter. It is therefore clear that the manifold pressure is caused to vary as a predetermined function of manifold and cylinder or other engine operative temperature, exhaust pressure and engine speed, said function obviously depending upon the form of slots 50, 71 and 68, or cams or other equivalent devices which may be substituted for said slots.

The above automatic regulation occurs when control lever 16 is in fully open adjustment, but at any time the pilot may rotate said lever clockwise for directly actuating valve 12 to reduce the manifold pressure, and as long as the latter is below the maximum preselected value corresponding to automatic operation, bellows 55 remains contracted, with plunger 35 to the left of its neutral position and piston 31 stationary in its extreme right position, the adjustment of valve 12 being thus determined by the adjustment of control lever 16. The regulating device however, stands ready to resume control as the manifold pressure attains said maximum predetermined value.

A displacement of control member 63, for example toward the left, determines a compression of bellows spring 59 or otherwise resiliently loaded bellows 56 and corresponding contraction of bellows 55 causing the valve 12 to be rotated clockwise to increase the manifold pressure until bellows 55 again expands the amount necessary to bring plunger valve 35 back to neutral position. The regulating device will thus maintain the manifold pressure, or the engine indicated M. E. P., at higher values, which may be represented in Fig. 4 by a line substantially similar to curve L but higher than the latter. In the example shown in Fig. 1 the control member 63, which actuates lever 60 by means of rod 62, is provided with four notches, 131, 132, 133 and 134, arranged to cooperate with the resilient detent 64. The adjustment illustrated, with notch 132 engaged by the detent, may correspond to maximum manifold pressure for continuous operation, while with notch 134, 133 or 131, engaged by the detent the engine manifold pressure may be automatically regulated for maximum take-off power, admissible for very short time, or temporary overload such as may be required for rapid climbing to high altitude, or cruising power respectively. The foregoing assumes, of course, that control lever 16 is in fully open adjustment, and that speed control member 22 is suitably set. For a given adjustment of control member 63 the engine power output may be controlled by varying the engine speed, through member 22. Furthermore, the portions of the connections between the various elements of the regulating device, such as slots 50, 71 and 68, which are effective during cruising operation, may be so designed as to automatically maintain the engine manifold pressure at values corresponding to maximum fuel economy.

Fuels of higher anti-knock rating have curves of maximum power for continuous output which are higher than line L of Fig. 4 and often have smaller slope at high manifold temperature. The regulating device of Fig. 1 may be adjusted for such fuels by means of a suitable turning adjustment of either or both members 61 and 75.

It is to be clearly understood that the invention may be applied to any suitable type of engine having any known type of supercharger, however driven, and to any type of throttle controlled engine, the latter case being illustrated in Figs. 2 and 3. Referring now in particular to Fig. 2, in which reference numerals already used in Fig. 1 designate similar parts, the engine 80 is controlled by means of a conventional throttle valve connected with lever 81 actuated by the regulating device 82 through rod 19. Lever 81 of Fig. 2 is equivalent to lever 14 of Fig. 1 in that clockwise or anticlockwise rotation thereof determines an increase or decrease of the engine manifold pressure respectively. One temperature responsive element 83 is provided to actuate lever 52, such element being preferably, although not necessarily, so arranged as to be responsive not only to the temperature of the air or mixture in the manifold 9, but also, to a predetermined extent, to the temperature of the surrounding parts of the engine cylinder 7. The regulating devices 82 and 29 are similar with the exception that bellows 74 has been eliminated from the former, the upper end of lever 85 thereof being pivoted on shaft 84 carried by the housing. Furthermore in the regulator 82 bellows 56 has a smaller effective area than bellows 55, and means such as a vent 136 is provided for keeping the pressure within housing 30 substantially equal to the surrounding pressure and in turn to the engine exhaust pressure, as the exhaust ports of engine 80 are substantially open to the atmosphere. The manifold pressure of this engine may thus be automatically regulated, or the maximum value thereof limited, substantially as a predetermined function of the manifold and engine cylinder temperatures, surrounding atmospheric pressure and engine speed, said function depending upon the adjustment of a control member connected with link or rod 62.

If it is not desired that the manifold pressure vary with the engine speed, the regulator may be simplified by eliminating the operative connection between the engine speed control member 22 actuating rod 66 and the sleeve 34. Accordingly, Fig. 6 shows a modification of Fig. 3, or Fig. 1, in which the lower end of lever 65, instead of being operatively connected by way of linkage 66 with the speed control member 22, is pivoted to the housing.

While in the illustrated embodiment the engine regulating device has been shown as adapted to regulate the manifold pressure, it will be apparent to those skilled in the art that various other arrangements may be utilized without in any way exceeding the scope of the invention. For example, since the engine torque and the manifold pressure are mutually dependent variables, devices substantially similar to those illustrated may be arranged to regulate the engine power by adjusting or limiting the engine torque as a preselected function of one or more engine operative conditions. One such arrangement is illustrated in Fig. 3, in which the engine 86 is provided with a throttle valve actuated by lever 81 for controlling the manifold pressure and in turn the engine torque, and with a torque meter 87, such as a hydraulic torque responsive device connected with a planetary speed reduction gear arranged between the engine crankshaft and the propeller shaft, for maintaining the oil pressure in suitable conduit and reservoir means or pressure line 88 at all times proportional to the torque transmitted from the engine to the propeller. Such a device, which is well known and is no part of the invention claimed herein, is more fully described in said application, Serial No. 423,001. The engine regulating device 90 includes a pressure responsive element such as a bellows 91 connected by means of pressure line 88, with the pressure chamber 124 of the torque member so that the pressure within said bellows is proportional to the engine torque. A member 54, connected with the upper end of lever 48, is arranged between the movable wall of bellows 91, to which it is secured, and a spring 92 adjustable by way of rod 62. The pressure within the housing closed by cover 76 is maintained at surrounding atmospheric pressure by means of a vent 93. The arrangement of regulator 90 and the operative connections thereof are otherwise similar to those already disclosed, as indicated in part by the reference numerals, and it will therefore be apparent that the regulator will adjust the engine torque, or limit the maximum value thereof, as a preselected function of the manifold and cylinder temperatures, surrounding atmospheric pressure and engine speed, said function being dependent on the adjustment of rod 62.

While particular mechanical embodiments have been somewhat diagrammatically illustrated for the purpose of disclosing the invention, it is to be understood that the invention is not limited to the arrangements so illustrated and described, but that such changes in the arrangement of the various parts and in the manner of operation thereof may be resorted to as come within the scope of the appended claims. In interpreting said claims, where they are directed to less than all of the elements of the complete system disclosed, they are to be construed as covering possible uses of the recited elements in installations which lack the non-recited elements.

I claim:

1. A pressure regulator for supercharged internal combustion engines comprising a servo-motor, means for connecting it with a throttle valve, in the air or fuel-mixture conduit of the engine, a manually operated member, a device responsive to engine intake pressure, servo-motor control means under control by said member for the purpose of selecting a pressure to be maintained and under control by the pressure responsive device for causing the servo-motor so to operate the throttle valve that a selected pressure is maintained, and means independent of the manually operated member for modifying the action of the servo-motor control means to prevent the maintenance of a high intake pressure when the temperature of the intake air or fuel mixture is reached such that engine detonation occurs with the high intake pressure.

2. A pressure regulator for supercharged internal combustion engines comprising a throttle valve movable to different positions to regulate the pressure maintained in the fuel induction conduit of said engine, a member movable to different positions to select different pressures to be maintained, automatic means controlled by variations in pressure in the induction pipe and operable to move the throttle so as to maintain any pressure selected by said selector member and means operable automatically and independently of the said selector member for modifying the action of the automatic means when operating conditions are such as would cause detonation so that the pressure maintained by said automatic means will be less than that selected by said selector member.

3. A pressure regulator for supercharged internal combustion engines comprising a throttle valve movable to different positions to regulate the pressure maintained in the fuel induction conduit of said engine, a member movable to different positions to select different pressures to be maintained, automatic means controlled by variations in pressure in the induction pipe and operable to move the throttle so as to maintain any pressure selected by said selector member and automatic mechanism independent of the said selector member for modifying the action of the automatic means, when operating conditions are such as would cause detonation if pressures above a certain maximum are maintained, to prevent the maintenance of pressures above such maximum regardless of the pressure selected.

4. A pressure regulator for supercharged internal combustion engines comprising a throttle valve movable to different positions to regulate the pressure maintained in the fuel induction conduit of said engine, a selector member movable to different positions to select different pressures to be maintained, automatic means controlled by the position of said selector member and variations in pressure in the induction pipe and operable to move the throttle so as to maintain any pressure selected by said selector member and automatic mechanism when operations are such that the selected pressure would cause detonation and operable, without changing the position of the selector member, to modify the action of said automatic means, so as to cause the pressure maintained under such conditions to be less than that selected by said selector member.

5. Apparatus for controlling the intake pressure of a supercharged internal combustion engine comprising a member for actuating a throttle valve in the engine induction passage, a servo-motor for operating said member, a device responsive to temperature of engine operating medium, an element responsive to engine intake pressure, a manually operable part, pressure selecting means operated by said part, means controlled by said device for modifying the action of the pressure selecting means so as to limit the obtainable pressure to a value less than can be demanded by manual operation, and means under control by said element and by said pressure selecting means for controlling the servo-motor.

6. Apparatus for controlling the pressure in the fuel mixture intake conduit of a supercharged aircraft engine comprising a throttle valve in said conduit movable to different positions to control the pressure therein, a servo-motor operatively connected to the throttle so as to move said valve when the servo-motor is operated, a manually operable pressure selecting member movable to different positions to select varying pressures up to a predetermined maximum, a pressure responsive device, a servo-motor control means the position of which is determined by said pressure selecting member and said pressure responsive means and effective to cause the servo-motor to move the throttle to a position to obtain whatever pressure is selected and to automatically maintain such pressure during operation of the aircraft and means independent of the pressure selecting member and automatically operable under operating conditions which would cause detonation at a selected pressure to limit the movement of the servo-motor control means so as to prevent sufficient opening of the throttle by said servo-motor to obtain a pressure as great as said selected pressure in order to prevent detonation when a pressure high enough to cause detonation under said operating conditions is selected by said selector member.

7. Apparatus for controlling the pressure in the fuel mixture intake conduit of a supercharged aircraft engine comprising a throttle valve in said conduit movable to different positions to control the pressure therein, a servo-motor operatively connected to the throttle so as to move said valve when the servo-motor is operated, a manually operable pressure selecting member movable to different positions to select varying pressures up to a predetermined maximum, a pressure responsive device, a servo-motor control means the position of which is determined by said pressure selecting member and said pressure responsive means and effective to cause the servo-motor to move the throttle to a position to obtain whatever pressure is selected and to automatically maintain such pressure during operation of the aircraft and means independent of the pressure selecting member and operable in response to variations in temperature in the fuel mixture intake conduit for limiting the movement of the servo-motor control means so as to prevent sufficient opening of the throttle to cause detonation at any particular intake temperature even if the pressure selecting member is positioned so as to select a high enough pressure to cause detonation at such particular temperature.

8. In a temperature regulator for a thermal powerplant having at least one combustion chamber, an air intake system with a compressor therein for supplying air under pressure to said combustion chamber, the combination with means for regulating the rate of fuel supply to said combustion chamber, of means responsive to variations in an operating temperature of the powerplant resulting from combustion and varying with the rate of fuel supply thereto, means responsive to air pressure in said intake system on the discharge side of said compressor, and a floating lever having a first portion connected with said fuel regulating means, a second portion connected with said temperature responsive means and a third portion connected with said pressure responsive means for varying the rate of powerplant fuel supply as a function of both said temperature and said pressure, the arrangement being such that the rate of fuel supply is caused to decrease as said temperature rises above a predetermined value.

9. In a control device for an engine having regulating means for varying the rate of engine fuel supply, the combination with fluid pressure actuated means for operating said regulating means, of valve means for controlling said fluid pressure actuated means, said valve means including first and second movable elements whose relative adjustment determines the operation of said pressure actuated means, a first mechanism subject to manual supervision for variably positioning said first element to select engine power, a first sensor device responsive to an operating condition of the engine which is a measure of engine power for positioning said second element to maintain engine power as selected, and an additional sensor device responsive to engine temperature for modifying the action of the first sensor device upon the second element so as to decrease the rate of engine fuel supply when the engine temperature rises above a preselected value.

10. In control apparatus for a combustion engine, the combination with regulating means for varying the rate of engine fuel flow, of valve means for controlling said regulating means, said valve means including two movable elements whose relative adjustment determines the operation of said regulating means, a manually operable mechanism for remotely positioning one of said elements, a sensor device responsive to an engine operating condition indicative of need for variation in the rate of engine fuel flow for moving the other element, and engine temperature responsive means for varying the effect of the sensor device upon the second element to decrease the rate of engine fuel flow when the engine temperature rises above a predetermined value.

11. A combustion engine controller having regulating means for controlling the rate of fuel flow to the engine, said regulating means including valve means comprising two movable valve elements one of which is provided with port means while the other is arranged to control said port means whereby the rate of engine fuel flow is caused to vary by altering the adjustment of either valve element, a control subject to manual supervision for positioning one of said valve elements, a first sensor device responsive to changes in a condition indicative of need for variation in the rate of engine fuel flow for moving the other valve element, and an additional sensor device responsive to an engine temperature and operatively connected with one of said valve elements for moving the same to decrease the rate of engine fuel flow upon a predetermined rise in said engine temperature.

12. In a fuel controller for an engine having an air intake system, a fuel regulating device for controlling the rate of fuel flow to the engine, said regulating device including valve means comprising two movable valve elements one of which is provided with port means while the other is arranged to control said port means whereby the rate of engine fuel flow may be caused to vary by altering the adjustment of either valve element, manually adjustable control means operatively connected with one of said valve elements for positioning the same, a sensor device responsive to changes of pressure in said air intake system operatively connected with the other valve element for positioning the same, and an additional sensor device connected with a portion of the engine and responsive to temperature variations therein for moving one of said valve elements to decrease the rate of engine fuel flow as said temperature increases.

13. An engine controller as defined in claim 11, further including means responsive to variations in the surrounding barometric pressure and operatively connected with said first sensor device for modifying the effect thereof upon the corresponding valve element.

14. A combustion engine controller having regulating means for controlling the rate of fuel flow to the engine, said regulating means including valve means comprising two movable valve elements one of which is provided with port means while the other is arranged to control said port means whereby the rate of engine fuel flow is caused to vary by moving either valve element, manually adjustable control means for positioning one of said valve elements, a first sensor device responsive to changes in an operative condition of the engine indicative of need for variation in the rate of fuel flow for moving the other valve element, and an additional sensor device responsive to variations in a temperature of the engine and connected by means of a cam with one of said valve elements for moving the same to decrease the rate of fuel flow as said temperature increases.

15. A combustion engine controller having regulating means for controlling the rate of fuel flow to the engine, said regulating means including valve means comprising two movable valve elements one of which is provided with port means while the other is arranged to control said port means whereby the rate of engine fuel flow is caused to vary by moving either valve element, manually settable control means for positioning one of said valve elements, means responsive to variations in a plurality of parameters of engine operation for moving the other valve element, and means responsive to changes in a temperature affecting engine operation for moving one of said valve elements to decrease the rate of engine fuel flow upon increase in said temperature.

16. An engine controller as defined in claim 14, further including adjusting means for modifying the datum of the first sensor device.

17. An engine controller as defined in claim 14, further including means responsive to changes in surrounding barometric pressure for modifying the effect of the first sensor device upon the valve element moved thereby.

18. In a combustion engine controller having fuel control means for regulating the rate of fuel flow to the engine, a control valve in said fuel control means, said valve comprising co-operating co-axial first and second valve elements each separately movable to vary the rate of engine fuel flow, manually operable control means for positioning the first valve element, and means responsive to a pressure tending to vary with the rate of engine fuel flow and means responsive to engine temperature operatively interconnected to actuate the second valve element, the temperature responsive means operating on said second valve element in the sense to decrease the rate of engine fuel flow as said engine temperature rises.

19. A device as in claim 18, in which the pressure responsive means and the temperature responsive means are connected to the second valve element by means of a floating lever.

20. A device as in claim 19, in which the pressure responsive means, the temperature responsive means and the second valve element are each connected to a different portion of said floating lever.

21. In control apparatus for an aircraft engine having an air induction system, the combination with regulating means including a servo-mechanism for varying the rate of engine fuel flow, of a valve for controlling the servo-mechanism, said valve comprising first and second co-operating valve elements whose relative adjustment determines the operation of the servo-mechanism, each of said valve elements being movable, a manually operable remote control for positioning the first valve element, a sensor device responsive to variations of pressure in the engine air induction system for actuating the second valve element, and engine temperature responsive means for actuating the second valve element in the sense to decrease the rate of engine fuel flow as the engine temperature increases.

22. A combustion engine controller having regulating means for controlling the rate of fuel flow to the engine, said regulating means including valve means comprising two movable valve elements one of which is provided with port means while the other is arranged to control said port means whereby the rate of engine fuel flow is caused to vary by altering the adjustment of either valve element, control means connected to one of said valve elements for adjusting the same, a first sensor device responsive to a condition indicative of need for variation in the rate of engine fuel flow for positioning the other valve element, an additional sensor device responsive to changes in an engine temperature, and an operative connection including cam means for actuating one of said valve elements from said additional sensor device to vary the rate of engine fuel flow as a preselected function of said temperature.

23. In a fuel controller for an engine having an air intake system, a fuel regulating device for controlling the rate of fuel flow to the engine, said regulating device including valve means comprising two movable valve elements one of which is provided with port means while the other is arranged to control said port means whereby the rate of engine fuel flow may be caused to vary by altering the adjustment of either valve element, control means operatively connected with one of said valve elements for variably positioning the same, a sensor device responsive to changes of pressure in said air intake system operatively connected with the other valve element for positioning the same, an additional sensor device connected with said air intake system and responsive to temperature variations therein, and an operative connection including cam means between said additional sensor device and one of said valve elements for moving said valve element to vary the rate of engine fuel flow as a predetermined function of said temperature.

24. In a fuel controller for a combustion engine having an air intake system with a compressor therein, the combination with regulating means for controlling the rate of fuel flow to the engine including valve means comprising two movable valve elements one of which is provided with port means while the other is arranged to control said port means whereby the rate of engine fuel flow is caused to vary by moving either valve element, of control means for variably adjusting one of said valve elements, a first sensor device responsive to pressure in said air intake system on the discharge side of the compressor for moving the other valve element, an additional sensor device connected with said air intake system to sense temperature variations therein, and an operative connection including cam means between the additional sensor device and one of said valve elements for moving the same to vary the rate of fuel flow in predetermined relation to said temperature.

References Cited in the file of this patent

UNITED STATES PATENTS

| 2,088,954 | Gregg | Aug. 3, 1937 |

FOREIGN PATENTS

| 458,350 | Great Britain | Dec. 17, 1936 |